(No Model.) 2 Sheets—Sheet 1.
J. D. ARMSTRONG.
ATTACHMENT FOR HARROWS.
No. 370,755. Patented Oct. 4, 1887.
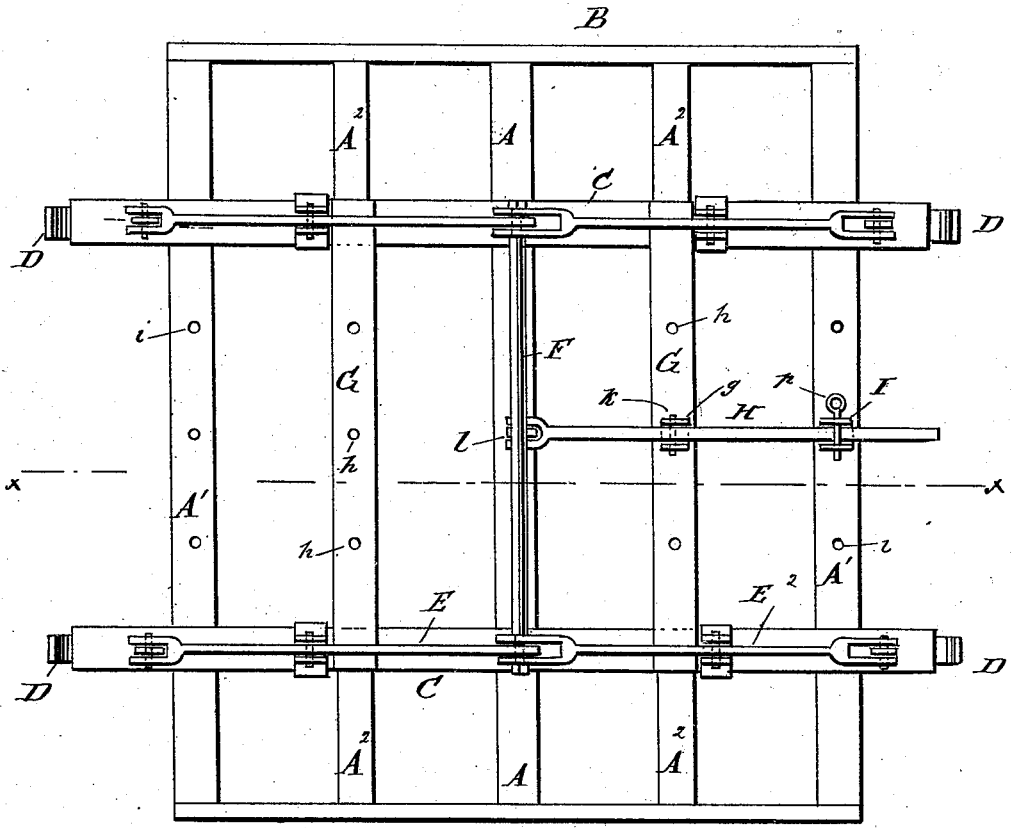
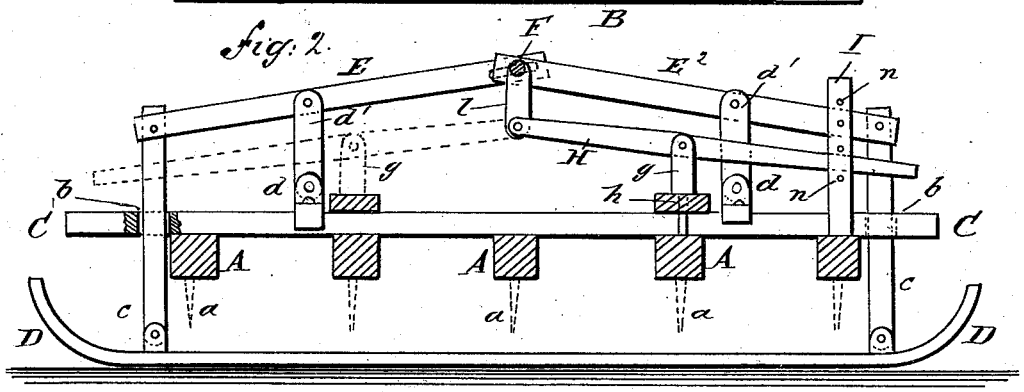
WITNESSES:
INVENTOR:
J. D. Armstrong
BY Munn & Co.
ATTORNEYS.

(No Model.) 2 Sheets—Sheet 2.
J. D. ARMSTRONG.
ATTACHMENT FOR HARROWS.
No. 370,755. Patented Oct. 4, 1887.
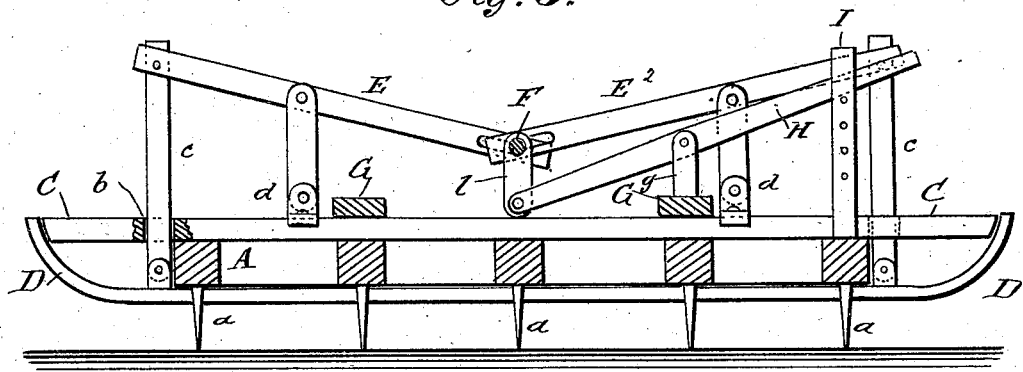
Fig: 3.
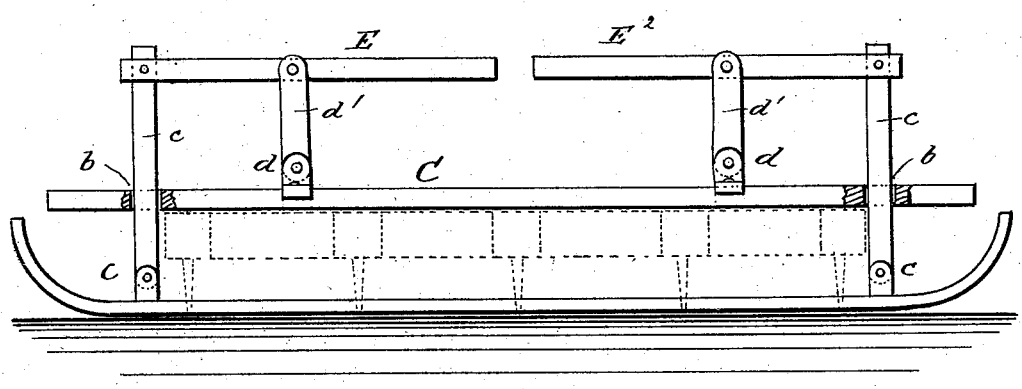
Fig: 4.

UNITED STATES PATENT OFFICE.

JAMES DAVIS ARMSTRONG, OF EFFINGHAM, KANSAS.

ATTACHMENT FOR HARROWS.

SPECIFICATION forming part of Letters Patent No. 370,755, dated October 4, 1887.

Application filed February 3, 1887. Serial No. 226,472. (No model.)

*To all whom it may concern:*

Be it known that I, JAMES DAVIS ARMSTRONG, of Effingham, in the county of Atchison and State of Kansas, have invented a new and Improved Attachment for Harrows, of which the following is a full, clear, and exact description.

My invention relates to farming implements; and its objects are to provide harrows with an attachment which will enable them to be raised and lowered at will, to decrease or increase the depth at which their teeth enter the ground and permit them to be cleaned, and also to enable said harrows to be readily transported from place to place without inverting them or employing a wagon for their conveyance.

Reference is to be had to the accompanying drawings, forming a part of this specification, in which similar letters of reference indicate corresponding parts in all the figures.

Figure 1 is a plan view of a harrow with my improvement attached to it. Fig. 2 is a vertical cross-section of the same, taken on the line $x$ $x$ in Fig. 1, showing the harrow raised for transportation. Fig. 3 is a similar view showing the harrow lowered for use upon the ground. Fig. 4 is a side elevation of the harrow attachment, parts being broken away and the position of the harrow being indicated by dotted lines.

The drawings show the harrow as composed of side bars, B, and cross-bars A, carrying teeth $a$ $a$. Upon the cross-bars of the harrow are secured in any suitable manner longitudinal beams C, bearing supports $d$ and constructed with sockets $b$ near their extremities. Compound levers E E² are fulcrumed upon the supports $d$ by links $d'$, and pivoted at their inner ends to a rod, F, and at their outer ends to the tops of posts $c$. The posts $c$ are pivoted to runners D, arranged longitudinally of the harrow beneath the beam A, and pass through the sockets $c$ in the beams C. Cross-bars G, constructed with sockets $h$ therein to receive a lever-support, $g$, connect the beams C. The cross-bars of the harrow are also constructed with sockets $i$ to receive a standard, I, which is bifurcated and constructed with holes $n$ $n$ to receive a locking-pin, $k$. A hand-lever, H, is fulcrumed upon the support $g$ and pivoted to a link, $l$, on the rod F.

When it is desired to transport the harrow from one place to another, the handle of the lever is depressed, causing the link $l$ to lift the rod F and operate the levers E E², bringing the runners D in contact with the ground, at the same time raising the supports $d$ and beams C. The harrow is thus raised, as shown in Fig. 2, and is sustained above the ground by locking the handle of the lever H in the standard I. It may then be drawn upon the runners to any point desired.

The teeth of the harrow may be caused to enter the ground to any desired depth by either entirely releasing the levers H from the standard I, or by setting it at any height or angle by means of the standard I and pin. The harrow-teeth may be readily cleaned and relieved from any matter which clogs their action upon the ground by elevating the harrow as I have described.

My invention may be applied to any harrow now in use. If it is desired to attach it to one having a lever to give a diagonal direction to its teeth, the beams C may be secured to its cross-bars by hinges or hinge-bolts. The rod F may be dispensed with, if desired, and a lifting-lever may be applied directly to the compound levers E E² without lessening the efficiency of my invention. The provision of the cross-bars G A A', &c., with the sockets $h$ and $i$ enables the lever-support $g$ to be placed in position on either side of the harrow. The runners being beneath the frame of the harrow at all times, the necessity is avoided of either overturning the harrow or loading it upon a wagon when it is to be transferred to another location. The runners enable the harrow to pass easily over uneven ground or minor obstructions, and also prevent the harrow-teeth from becoming entangled with stalks, sticks, grass, &c. Bags of seed or various farming tools and implements may be borne on the harrow and be thus at hand in case of need. My invention may be employed without the harrow for the transportation of such seed and tools, and thus answer the purpose of a drag.

The lifting-lever H is reversed for use upon the side of the harrow other than that to which it is shown in Figs. 1, 2, and 3 by releasing said lever from the standard I and support Q and transferring said standard and support to the sockets $i$ and $h$ in the center of the cross-bars A' and G on the other side of the harrow.

The lever H is then thrown over, its link turning the rod F, and it is again secured in the support q. (See Fig. 2.) The runners D being upturned at each end enable the harrow to be drawn in the reverse direction without the necessity of turning it around for that purpose.

Having thus fully described my invention, I claim as new and desire to secure by Letters Patent—

1. The attachment for harrows herein described, consisting of parallel longitudinal beams having compound lifting-levers mounted thereon, a transverse rod, having a link rigidly secured to its center, journaled to said levers at their junction, and cross-bars connecting said beams, constructed with vertical central sockets to receive a support for a hand-lever journaled to said link, said compound levers being attached by posts and connecting-pieces to runners upturned at both extremities, all constructed and arranged to operate substantially as shown and described.

2. In a harrow attachment, the combination of the longitudinal beams C, runners D, levers E $E^2$, supports d, and posts c, with a harrow, substantially as herein shown and described.

3. In an attachment for harrows, the combination of the runners D, posts c, beams C, supports d, levers E $E^2$, rod F, and cross-bars G, with a harrow, substantially as herein shown and described.

4. In a harrow attachment, the combination of the runners D, posts c, beams C, supports d, levers E $E^2$, rod F, lever-support g, and lever H, with a harrow, substantially as herein shown and described.

JAMES DAVIS ARMSTRONG.

Witnesses:
W. S. DAVISS,
S. R. DAVIS,
H. J. CARE.